United States Patent
Rohlf

(10) Patent No.: US 9,105,129 B2
(45) Date of Patent: Aug. 11, 2015

(54) LEVEL OF DETAIL TRANSITIONS FOR GEOMETRIC OBJECTS IN A GRAPHICS APPLICATION

(71) Applicant: John H. Rohlf, Truckee, CA (US)

(72) Inventor: John H. Rohlf, Truckee, CA (US)

(73) Assignee: Google Inc., Mountain View, CA (US)

( * ) Notice: Subject to any disclaimer, the term of this patent is extended or adjusted under 35 U.S.C. 154(b) by 444 days.

(21) Appl. No.: 13/626,296

(22) Filed: Sep. 25, 2012

(65) Prior Publication Data

US 2013/0321399 A1     Dec. 5, 2013

Related U.S. Application Data

(60) Provisional application No. 61/655,899, filed on Jun. 5, 2012.

(51) Int. Cl.
  *G06T 17/00* (2006.01)
  *G06T 17/05* (2011.01)
  *G06T 15/50* (2011.01)

(52) U.S. Cl.
  CPC .............. *G06T 17/05* (2013.01); *G06T 15/503* (2013.01); *G06T 2210/36* (2013.01)

(58) Field of Classification Search
  None
  See application file for complete search history.

(56) References Cited

U.S. PATENT DOCUMENTS

| | | | |
|---|---|---|---|
| 5,949,426 A * | 9/1999 | Rich .............................. | 345/582 |
| 6,373,482 B1 | 4/2002 | Migdel et al. | |
| 6,501,482 B1 * | 12/2002 | Rosman et al. ............... | 345/587 |
| 6,654,023 B1 | 11/2003 | Peterson | |
| 6,707,458 B1 * | 3/2004 | Leather et al. ................ | 345/582 |
| 6,747,649 B1 * | 6/2004 | Sanz-Pastor et al. ......... | 345/428 |
| 267,982 A1 | 11/2006 | Aguera y Arcas | |
| 91,732 A1 | 4/2008 | Schmidt et al. | |
| 259,976 A1 | 10/2009 | Varadhan et al. | |
| 7,643,673 B2 | 1/2010 | Rohlf et al. | |
| 7,746,343 B1 | 6/2010 | Charaniya et al. | |
| 7,094 A1 | 1/2011 | Nash et al. | |
| 141,300 A1 | 6/2011 | Stec et al. | |
| 7,965,902 B1 * | 6/2011 | Zelinka et al. ................ | 382/284 |

(Continued)

FOREIGN PATENT DOCUMENTS

WO     WO 2011/017063     2/2011

OTHER PUBLICATIONS

U.S. Appl. No. 13/412,796, filed Mar. 6, 2012, John H. Rohlf, Texture Fading for Smooth Level of Detail Transitions in a Graphics Application.

(Continued)

*Primary Examiner* — Aaron M Richer
*Assistant Examiner* — Anh-Tuan V Nguyen
(74) *Attorney, Agent, or Firm* — Dority & Manning, P.A.

(57) ABSTRACT

Systems and methods for providing smooth level of detail transitions for geometric objects, such as geometric terrain tiles, are provided. In one embodiment, a parent geometric tile associated with a first level of detail can be partitioned into sub-tiles. The sub-tiles can be blended independently with child geometric tiles associated with a second level of detail. The blends can be adjusted as a function of camera distance over a transition range to provide a smooth level of detail transition. Various enhancements and modifications can be made to the level of detail transition, such as implementing a bias in the level of detail calculation, implementing an unpop algorithm over only a subset of the transition range, implementing a time based fade during a camera stop, and other enhancements.

26 Claims, 10 Drawing Sheets

(56) References Cited

U.S. PATENT DOCUMENTS

| | | | |
|---|---|---|---|
| 2002/0126133 A1* | 9/2002 | Ewins | 345/587 |
| 2002/0159632 A1* | 10/2002 | Chui et al. | 382/168 |
| 2004/0109004 A1* | 6/2004 | Bastos et al. | 345/587 |
| 2004/0233219 A1* | 11/2004 | Aguera y Arcas | 345/606 |
| 2006/0146053 A1* | 7/2006 | Gatewood et al. | 345/440 |
| 2006/0170693 A1* | 8/2006 | Bethune et al. | 345/568 |
| 2006/0238628 A1* | 10/2006 | Vanhatalo | 348/240.99 |
| 2007/0040851 A1* | 2/2007 | Brunner et al. | 345/629 |
| 2010/0046846 A1* | 2/2010 | Brown | 382/233 |
| 2010/0182323 A1* | 7/2010 | Nuydens | 345/441 |
| 2011/0316854 A1* | 12/2011 | Vandrovec | 345/420 |
| 2012/0210274 A1* | 8/2012 | Pettigrew et al. | 715/810 |
| 2013/0067420 A1* | 3/2013 | Pittappilly et al. | 715/863 |

OTHER PUBLICATIONS

Giegl et al., "Unpopping: Solving the Image-Space Blend Problem for Smooth Discrete LOD Transitions", Computer Graphics Forum, vol. 26, No. 1, Mar. 2007, pp. 46-49.

Rohlf et al., "IRIS Performer: A High Performance Multiprocessing Toolkit for Real-Time 3D Graphics", In Proceedings of the 21st Annual Conference on Computer Graphics and Interactive Techniques (SIGGRAPH '94). ACM, New York, NY, USA, pp. 381-394.

Bhattacharjee et al., "Real-Time Rendering and Manipulation of Large Terrains", IEEE Sixth Indian Conference on Computer Vision, Graphics and Image Processing, Dec. 16-19, 2008, 10 pages.

International Search Report from PCT/US2013/043975 (GGL-126-PCT) 3 pages.

* cited by examiner

LEVEL 15

LEVEL OF DETAIL TRANSITIONS FOR GEOMETRIC OBJECTS IN A GRAPHICS APPLICATION

PRIORITY CLAIM

The present application claims priority to U.S. Provisional Patent Application Ser. No. 61/655,899 filed Jun. 5, 2012 which is incorporated herein by reference for all purposes.

FIELD

The present disclosure relates generally to computer graphics and more particularly to rendering geometric objects in a system for displaying imagery, such as geographic imagery in a geographic information system.

BACKGROUND

Geographic information systems provide for the archiving, retrieving, and manipulating of data that has been stored and indexed according to geographic coordinates of its elements. A geographic information system generally includes a variety of data types, including imagery, maps, and tables. Improvements in computer processing power and broadband technology have led to the development of interactive geographic information systems that allow for the navigating and displaying of geographic imagery. Some interactive geographic information systems provide a user interface with navigation controls for navigating cities, neighborhoods, geographic areas and other terrain in two or three dimensions. The navigation controls can enable users to tilt, pan, rotate, zoom, and activate views of terrain, buildings, and other objects from different perspectives at a geographic area of interest. An example of an interactive geographic information system for navigating geographic imagery is the Google Earth™ virtual globe application and the Google Maps™ mapping application developed by Google Inc.

The imagery used by these interactive systems can be derived by rending geometric objects and texture objects to generate a two-dimensional or three-dimensional graphical representation of a geographic area of interest. The geometric objects can define three-dimensional surfaces of objects (e.g. buildings, bridges, etc.) and terrain depicted in the imagery. For instance, in a virtual globe application, the geometric objects can include geometric tiles having a plurality of mesh triangles used to model the terrain and other geometry of a geographic area. Other suitable geometric objects can be used to model objects such as buildings, bridges, and other features. Texture objects can be mapped to the three-dimensional surfaces of the geometric objects to add detail, surface texture, color and other features to the graphical representation. For instance, in a virtual globe application, texture objects based on map imagery, satellite imagery or other geographic imagery can be rendered on terrain surfaces to enhance the graphical representation of the geographic area in the virtual globe application.

Interactive systems for displaying imagery, such as geographic imagery, often render geometric objects, such as terrain objects, with low level of detail (e.g. low resolution) at camera views far from an area of interest to improve performance. As the user zooms in closer to the area of interest, geometric and texture objects with higher level of detail (e.g. higher resolution) are rendered to depict objects in greater detail. Transitioning between two levels of detail can cause a distracting pop if the levels of detail are sufficiently different and/or the transition happens too close to the camera view. The pop can be a visual anomaly which disrupts the user's sense of immersion in the imagery.

SUMMARY

Aspects and advantages of the invention will be set forth in part in the following description, or may be obvious from the description, or may be learned through practice of the invention.

One exemplary aspect of the present disclosure is directed to a computer-implemented method for providing level of detail transitions in a system for displaying geographic imagery. The method includes displaying, in a user interface of a display device, a representation of a geographic area at a first camera distance associated with a first level of detail. The representation at the first camera distance includes a first geometric tile associated with the geographic area. The first geometric tile is rendered at a first level of detail. The method includes initiating a transition to a representation of the geographic area at a second camera distance associated with a second level of detail. The representation at the second camera distance includes a second geometric tile associated with the geographic area. The second geometric tile is rendered at a second level of detail. The method further includes rendering, in the user interface of the display device, a blend between a sub-tile of the first geometric tile and the second geometric tile. The sub-tile is obtained by partitioning the first geometric tile into a plurality of sub-tiles. The method further includes adjusting the blend as a function of camera distance over at least a portion of a transition range between the first camera distance and the second camera distance during the transition from the first camera distance to the second camera distance.

Other exemplary aspects of the present disclosure are directed to systems, apparatus, computer-readable media, devices, and user interfaces for providing smooth level of detail transitions for geometric objects in graphics applications, such as a virtual globe application.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
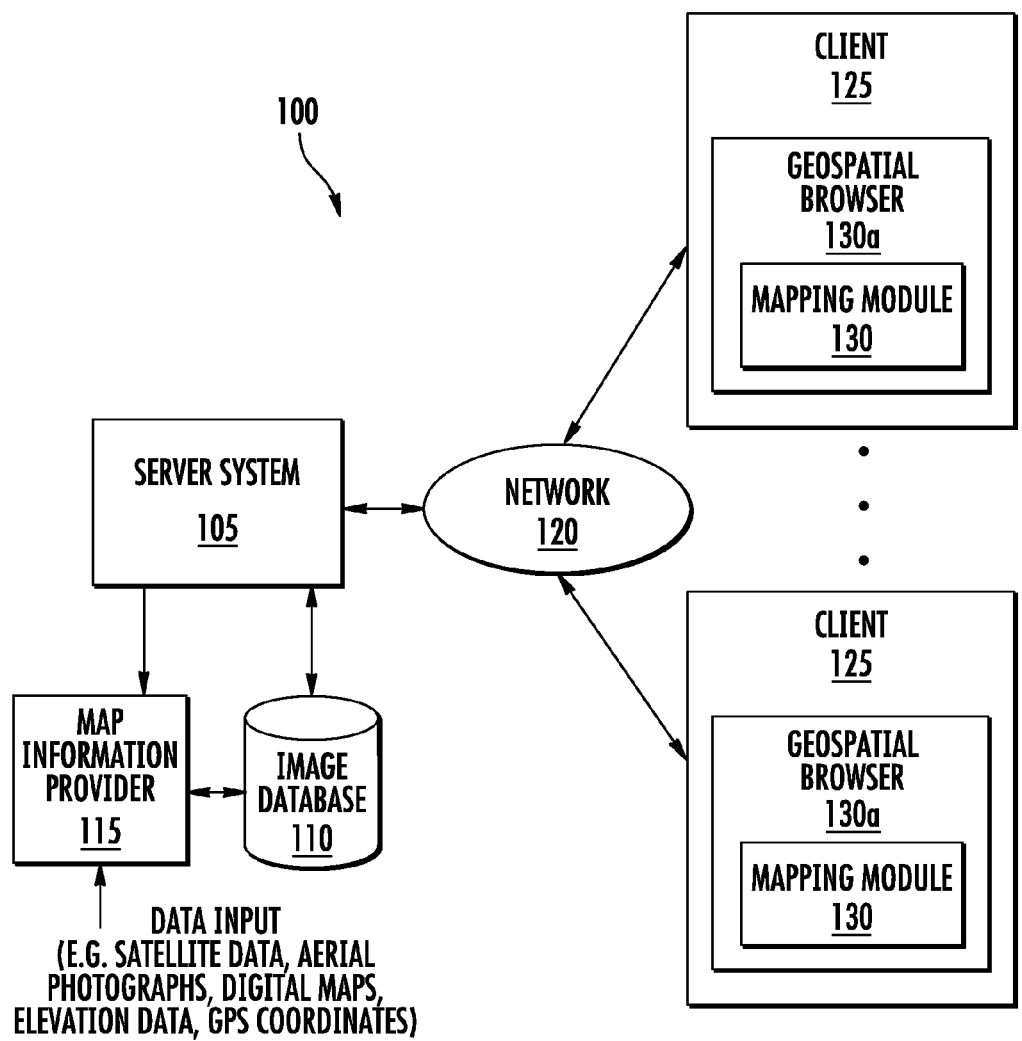
FIG. 1 depicts a computer-based system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for providing level of detail transitions for geometric objects in a graphics application, such as terrain objects, building objects and other three-dimensional objects in a virtual globe or mapping application. Interactive geographic information systems, such as the Google Earth™ virtual globe application provided by Google Inc., can partition geometric objects associated with a geographic area into a plurality of geometric tiles or other recursive partitioning scheme. The geometric tiles can include varying levels of detail associated with differing resolutions of the geometric objects. For instance, geometric tiles associated with higher resolutions or levels of detail can include a greater number of mesh triangles to model the geometry when compared to geometric tiles associated with lower resolutions or levels of detail.

To manage performance, coarser geometric tiles having lower level of detail (e.g. resolution) can be displayed to a user when the user is viewing a geographic area from a relatively large camera distance (i.e. the distance from the user's viewpoint to the geographic area). Finer geometric tiles having an increased level of detail (e.g. resolution) can be displayed to the user as the user transitions from a camera distance far from the geographic area to a camera distance that is closer to the geographic area. For instance, as a user zooms in on a particular geographic area, finer geometric tiles having a higher level of detail can be presented to the user.

According to aspects of the present disclosure, the geometric tiles can be configured in a hierarchical tree data structure, such as a quadtree or octree data structure, such that a parent geometric tile has a plurality of child geometric tiles (e.g. four children tiles in a quadtree data structure and eight children tiles in an octree data structure). This allows fetching and displaying of only those portions of geometric objects, such as terrain, of a geographic area within the current view at a desired resolution. The parent geometric tile generally has a lower level of detail relative to its children terrain tiles. As the camera distance transitions from a camera distance associated with the parent geometric tile to a closer camera distance, the parent geometric tile is replaced with its children geometric tiles to achieve the increased level of detail (i.e. higher resolution) at the closer camera distance.

The substitution of lower resolution parent tiles with higher resolution children tiles can cause a distracting visual "pop" disrupting the immersive quality of the interactive navigation experience of the user. To reduce the "pop," the subject matter of the present disclosure uses various techniques for blending a parent geometric tile with its children geometric tiles during the transition from a first camera distance associated with a first level of detail to a second camera distance associated with a second level of detail.

For instance, according to one aspect of the present disclosure, the parent geometric tile can be partitioned into a plurality of sub-tiles, such as quadrants, octants or any other suitable sub-division of the geometric tile. As an example, the parent geometric tile can be a select combination of geometric objects drawn in quadrants. Each of the plurality of sub-tiles (e.g. quadrants, octants, etc.) can be associated with the same geographic area or coordinates as one of the plurality of child geometric tiles. The transition between the first camera distance and the second camera distance can include independently rendering a blend, such as an alpha blend, between one of the plurality of sub-tiles and one of the child geometric terrain tiles. The blend can then be adjusted as a function of camera distance (e.g. based on a level of detail calculation associated with a camera distance) over at least a portion of the transition range between the first camera distance associated with the first level of detail and the second camera distance associated with the second level of detail.

In particular, the blend can be adjusted such that during the transition from the first camera distance to the second camera distance, the transparency of the child tile relative to the parent tile increases over a portion of the transition range and such that the transparency of the sub-tile relative to the child tile decreases over a portion of the transition range. Adjusting the blend in this manner can provide a smooth transition between the first camera distance and the second camera distance, reducing the distracting visual pop that can result from sudden level of detail transitions.

Various modifications and enhancements can be made to this exemplary aspect of the present disclosure. For instance, in one embodiment, the blend can be adjusted as a function of distance over at least a portion of the transition range pursuant to a suitable unpop algorithm. The unpop algorithm can calculate or determine respective alpha values for the sub-tile and the child geometric terrain tile in the blend as a function of camera distance over at least a portion of the transition range. The alpha values control the transparency of the geometric tiles in the blend. The alpha values are adjusted as a function of camera distance in the transition range to provide a smooth level of detail transition from the first level of detail at the first camera distance to the second level of detail at the second camera distance.

In one example, the unpop algorithm can include increasing the opacity of the child geometric tile in the blend from 0% to 100% (e.g. increasing the alpha value associated with the child geometric tile from 0 to 1) over a first portion of the transition range while the sub-tile is maintained at an opacity of about 100% (e.g. the alpha value associated with the sub-tile is maintained at about 1). The unpop algorithm then decreases the opacity of the sub-tile in the blend from 100% to 0% (e.g. decreasing the alpha value associated with the sub-tile from 1 to 0) over a second portion of the transition range while the child geometric tile is maintained at an opacity of about 100% (e.g. the alpha value associated with the child geometric tile is maintained at about 1). This avoids visual artifacts (e.g. transparency issues) that can occur when rendering a blend where the geometric objects in the blend are both at less than 100% opacity.

Adjusting the blend pursuant to an unpop algorithm can result in having to render geometric tiles at least twice during the transition from the first level of detail to the second level of detail. To reduce the percentage of double drawing of the geometric tiles, the unpop algorithm can be implemented only over an unpop range that is a subset of the transition range, such as over 20% of the transition range. Other level of detail transition techniques (e.g. morphing) can take place during the transition to reduce popping.

Adjusting the blend pursuant to an unpop algorithm can also result in the drawing of both the sub-tile and the child geometric tile at about 100% opacity at a certain camera distance. For instance, if implementing an unpop algorithm across an entire transition range, the sub-tile and the child geometric tile can both be rendered at about 100% opacity at a camera distance associated with a halfway point in the unpop range. This can cause the geometric tiles to appear blurry where the sub-tile associated with the coarser LOD is visible due to a zbuffer decision (i.e. the coarser geometric tile is closer to the eye than the finer geometric tile). To account for this, exemplary aspects of the present disclosure are directed to implementing a bias in the level of detail calculation to ensure that the coarser geometric tile displayed to the user during unpopping is not blurry. In a particular aspect, the bias can be equal to the unpop range to ensure that the coarsest tile used in the blend during the transition is associated with the next highest level of detail for the camera distance such that none of the tiles used in the blend appear blurry.

During certain level of detail transitions, interior skirts can rendered between adjacent sub-tiles to prevent "gaps" and other visual artifacts between mesh triangles and other geometric objects in the adjacent sub-tiles. The skirts can always be drawn between adjacent sub-tiles. Alternatively, the skirts can only be drawn between subtiles associated with differing levels of detail.

In certain circumstances, the camera (e.g. viewpoint) can stop moving during the middle of the transition from the first camera distance and the second camera distance. In this scenario, geometric terrain tiles can be rendered as a blend in the middle of an unpop transition, resulting in potential visual artifacts. According to another particular aspect of the present disclosure, the blend can be adjusted over time as the camera is stopped so that the geometric tiles are eventually snapped to the next highest level of detail. For instance, an incrementing offset can be used in the determination of blend ratios (e.g. calculation of alpha values) for the sub-tile and the child geometric tile. The incrementing offset can increase over time according to a first blend rate such that that offset increases for each rendering frame until the geometric tiles are rendered at the higher level of detail. The first blend rate (or the amount the incrementing offset is increased for each rendering frame) can be tied to wall clock time so that the higher level of detail is reached in a constant time, such as 0.5 seconds. If the camera starts moving again after a camera stop, the incrementing offset can be gradually reduced at a second blend rate. The second blend rate can be the same as or different from the first blend rate, such as lower than the first blend rate. In a particular embodiment, the second blend rate can be determined based on the speed of the camera motion so that the incrementing offset is reduced quicker when the camera motion is moving at a faster rate.

According to another aspect of the present disclosure, a time based fade can be implemented to reduce the popping of geometric tiles as new data becomes available. Often the camera can get ahead of the fetching or availability of geometric tiles, causing the user can see blurry data before the higher resolution geometric tiles are fetched or otherwise received or become available. When the higher resolution geometric tiles are received or otherwise become available, the user can see a distracting pop as the higher resolution tiles come into view. To reduce the pop, the blend can be adjusted using a time based level of detail fade after the higher resolution tiles become available. The time based level of detail fade can cause a gradual transition from the coarser resolution tiles to the finer resolution tiles. The transition rate can be tied to wall clock time so that a single level transition can happen in a relatively short period of time, such as less than one second. The transition rate for the time based level of detail fade can be scaled based on the number of transition levels; speeding up the transition across a greater number of transition levels to ensure that scene resolution time remains relatively constant.

Exemplary embodiments of the present disclosure will now be discussed in detail. The present subject matter will be discussed with reference to graphics applications allowing a user to navigate geographic imagery, such as the applications associated with the Google Earth™ and Google Maps™ services provided by Google Inc., such as a geographic area that includes a portion of a globe, as well as other 3D and/or 2D imaging systems. Those of ordinary skill in the art, using the disclosures provided herein, should understand that the present disclosure is equally applicable to other suitable graphics applications.

FIG. 1 illustrates an exemplary computer-based geographic information system 100 configured in accordance with an embodiment of the present invention. The geographic information system 100 provides for the archiving, retrieving, and manipulation of geospatial data that has been indexed and stored according to geographic coordinates, such as latitude, longitude, and altitude coordinates, associated with the geospatial data. The system 100 can combine satellite imagery, photographs, maps, models, and other geospatial data, and Internet search capability so as to enable a user to view imagery of the planet (e.g. as a portion of a virtual globe) or other spheroid and related geographic information (e.g., locales such as islands and cities; and points of interest such as local restaurants, hospitals, parks, hotels, and schools). The system further allows the user to conduct local searches, get travel directions to a location or between two locations. The user can virtually fly from space (e.g., some vantage point above the Earth) to and around an entered target address or location, such as a neighborhood or other area of interest. Results can be displayed in a three-dimensional representation of the area of interest. The user can pan, tilt, and rotate the view to see three-dimensional terrain and buildings.

The user can also annotate maps, and/or enable data layers to show, for example, parks, schools, hospitals, airports, shopping, and other points of interest or locales. The user can also layer multiple searches, save results to folders, and share search results and maps with others. In addition, a data exchange format referred to herein as KML (Keyhole Markup Language) enables the user to share useful annotations and view thousands of data points created by other system users. An exemplary graphical user interface allowing the user to interact with the system will be discussed with reference to FIG. 2.

Referring to FIG. 1, the system includes a client-server architecture, where the server-side communicates with one or more clients 125 via a network 120. Although two clients 125 are illustrated in FIG. 1, any number of clients 125 can be connected to the server-side over the network 120. The server-side includes a server system 105, an image database 110, and a map information provider 115. On the client-side, each client 125 includes a mapping module 130 that operates as a geospatial browser 130a (or other suitable viewer), so as to provide the user with an interface to the system. In one embodiment, at least some of the mapping modules 130 of the clients 125 further include development modules that end-users can use to generate data files describing particular presentations of data. In addition, the system may further include one or more third-party content servers.

The server system 105 can be any computing device and can include a processor and a memory. The memory can store instructions which cause the processor to perform operations. The server system 105 is in communication with the database 110. The database can store geospatial data to be served or provided to the client 125 over the network 120. The geospatial data can be indexed pursuant to a hierarchical spatial partitioning scheme according to exemplary aspects of the present disclosure. The database 110 can includes image data (e.g., digital maps, satellite images, aerial photographs, street-level photographs, models, etc.), non-image data such as tabular data (e.g., digital yellow and white pages), and map layer data (e.g., database of diners, restaurants, museums, and/or schools; databases of seismic activity; database of national monuments; etc.) can also be stored in database 110 or in some other storage facility accessible to server system 105. The database 110 (and others, if applicable) is populated (e.g., offline or in real-time) by the server system 105.

The map information provider 115 provides server system 105 with map information (e.g., satellite data, street-level photographs, aerial photographs, digital maps, elevation data, longitude/latitude data, GPS coordinates). The provided map information can be collected, for example, as a function of the server system 105 (e.g., map information provider 115 is a database of map information collected by the server system 105). Alternatively, or in addition, various third party map data services can be used to provide map information to server system 105. All such map internal/external information sources are generally represented by map information provider 115.

In any case, the server system 105 receives requests for map information, and responds to those requests, via the network 120. The map information provider 115 can also be further configured to respond directly to user requests for geographic data. In one embodiment, the server system 105 encodes the map information in one or more data files and provides the files to the requestor.

Note that other modules may be included in the system, and that illustrated modules may be rearranged. For instance, the database 110 can be integrated into the server system 105. Also, the map information provider 115 can be integrated into the server system 105. Other configurations will be apparent in light of this disclosure, and the present invention is not intended to be limited to any particular one. Any number of modules can be programmed or otherwise configured to carry out the server-side functionality described herein.

A client 125 on which the mapping module 130 runs can be, for example, a computing device having a processor and a memory, such as a desktop or laptop computer. Alternatively, a client 125 can be a wireless device, such as a personal digital assistant (PDA), smart phone, tablet, a navigation system located in a vehicle, a handheld GPS system, or other such devices/systems. In short, the client 125 can be any computer, device, or system that can execute the mapping module 130, and allows the user to interact with the server system 105 (e.g., requesting maps, driving directions, and/or data searches, and then receiving data files in response). In the embodiment shown, the mapping module 130 executes or otherwise runs as geospatial browser 130a.

The server system 105 can be implemented with conventional or custom technology. Numerous known server architectures and functionalities can be used to implement a geographic information system server. Further note that the server system 105 may include one or more servers operating under a load balancing scheme, with each server (or a combination of servers) configured to respond to and interact with clients via the network 120.

In general, when the user enters a search query (e.g., via the geospatial browser 130a presented by the client-side mapping module 130), it is put into a request and sent to the server system 105 via the network 120. The server system 105 then determines what the search query is for, and responds with the appropriate data from various sub-systems, such as geo-coders, routing engines, and local search indexes, in a format that the requesting client 125 can use to present the data to the user (e.g., via the geospatial browser 130a).

In addition to any conventional functionality, the server system 105 is further configured to interact with the mapping module 130, as will be apparent in light of this disclosure. In one embodiment, the server system 105 responds to the requesting client 125 by encoding data responsive to the request into one or more data files and providing the files to the client.

The network 120 can be any type of communications network, such as a local area network (e.g., intranet), wide area network (e.g., Internet), or some combination thereof. Alternatively, the network 120 can be a direct connection between a client 125 and the server system 105. In general, communication between the server system 105 and a client 125 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Used in conjunction with the server system 105, the geospatial browser 130a interface provided by the mapping module 130 provides a interactive geographic information system that serves maps and data over the network 120. The system allows users to visualize, select, annotate, and explore geographic information all over the world or in a particular region, city, town, or other locale.

Figure 2:
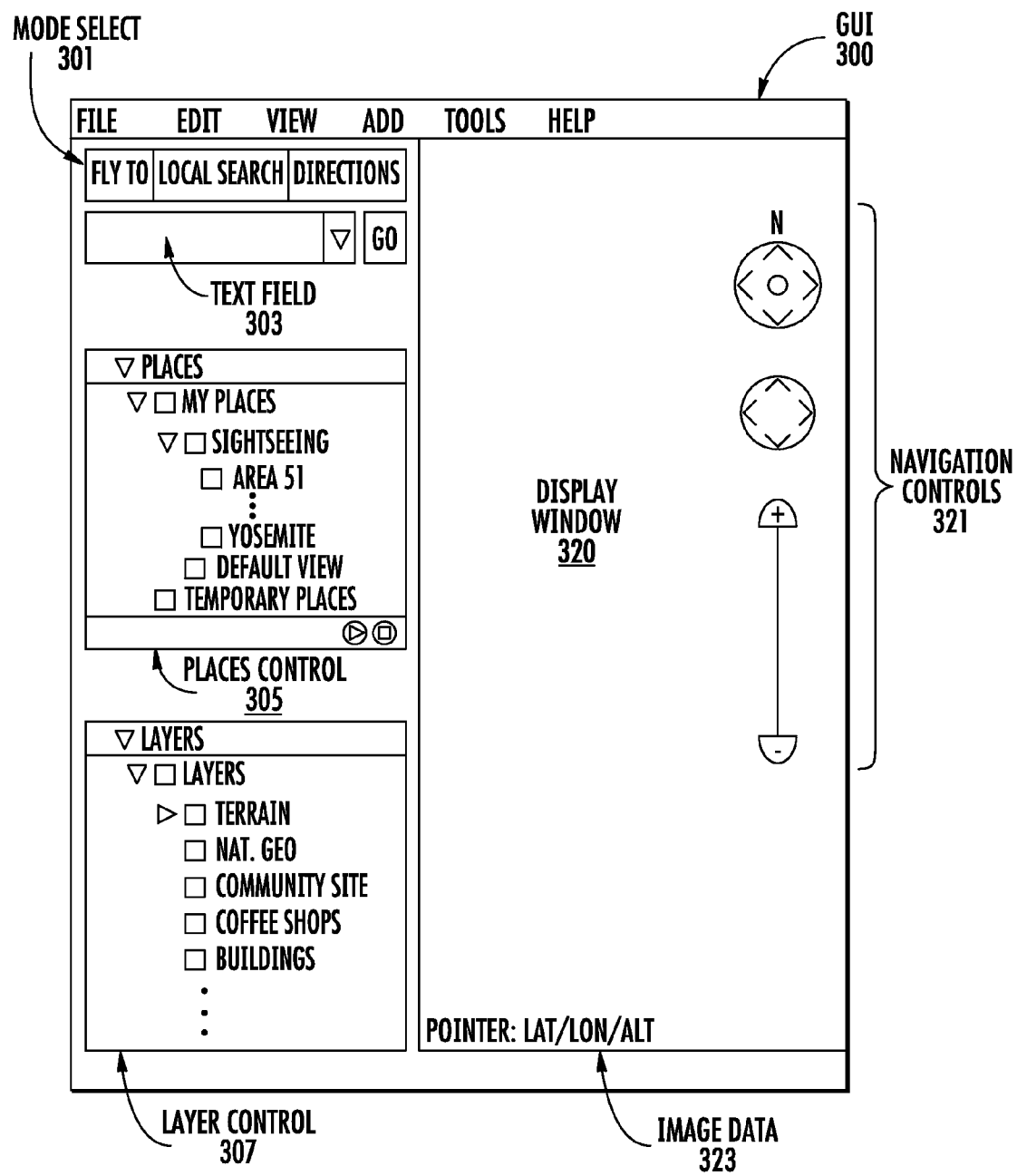
FIG. 2 depicts a graphical user interface for an interactive imaging system according to an exemplary embodiment of the present disclosure.

FIG. 2 illustrates one particular embodiment of a graphical user interface ("GUI") 300, which operates as a geospatial browser 130a for mapping module 130. The GUI includes a display window 320 for displaying 3D imagery, such as a portion of a globe, and a text input field 303 for entering location information such as latitude and longitude, an address and/or zip code, or the name of a well-known site (e.g., "Lincoln Memorial" or "Area 51"). The GUI 300 has a number of modes in which it can operate, including Fly To mode, Local Search mode, and Directions mode, as shown by mode select buttons 301. The GUI 300 also includes navigation controls 321 for adjusting the viewing altitude, adjusting the viewing angle, adjusting the view left and right, and adjusting the view to areas of the 3D imagery to the left, right, top or bottom of the display window.

The GUI 300 also includes places control 305, which allows the user to organize saved data in a Places panel in a way similar to how a user would organize files and folders on a computer's hard drive. The GUI 300 also includes layer control 307, which provides a variety of data points of geographic interest (e.g., points of interest, as well as map, road, terrain, and building data) that a user can select to display over the viewing area. In the embodiment shown in FIG. 2, example commonly used layers are available on the Layers panel. The GUI 300 of this example embodiment also displays image data 323 in the lower portion of the display window 321. Image data 223 can include pointer/cursor coordinates (e.g. lat/lon/altitude), streaming percentage completion, and eye altitude (i.e. camera distance).

Numerous GUI configurations and underlying functionalities will be apparent in light of this disclosure, and the present invention is not intended to be limited to any one particular configuration. The displayed 3D maps can be manipulated using the GUI 300. The GUI 300 can be used to reposition the current map view, for example, by clicking and dragging in the display window 321. A user may also select a geographical location by double-clicking on it within the display window 320.

Referring back to FIG. 1, the mapping module 130 associated with the client device can include software that operates (in conjunction with server-side software) to provide geographic/geospatial images to a user's computer (or generally, client device) so they can be seen by the user or otherwise processed. In accordance with one particular embodiment, the mapping module 130 includes a user interface module, in which a motion model in the user's client is used to adjust the client's virtual viewing position and orientation relative to the visual environment of the system. The motion model also determines a view specification which defines the client's viewable volume within a three-dimensional space (this viewable volume is known as a frustum and herein referred to as the user's visual environment), and the position and orientation of the frustum, herein referred to as the virtual camera viewpoint, with respect to a three-dimensional map. The camera distance refers to the distance between the virtual camera viewpoint and the representation of the geographic area. Once a visual specification is determined, it is placed in the memory.

The view specification can be read from the memory by a renderer, which is a software tool that draws or "renders" drawable data. The renderer can be configured to repeat a processing cycle, which includes: (1) reading the view specification in memory, (2) traversing a data structure in memory, (e.g. a hierarchical tree data structure, in which each node of the tree contains drawable data), and (3) drawing the drawable data contained in the data structure.

One exemplary data structure includes a quadtree data structure in which each quad node has a payload of data and references to other files (e.g. four), each of which may be other quad nodes. When the renderer traverses the quadtree, it first reads the payload of data in a parent quad node. If the payload is drawable data, the renderer will compare a bounding volume (a volume that contains the data) of the payload, if present, to the view specification. If the bounding volume is completely disjoint from the view specification, the data will not be drawn, despite the fact that the quad node has already been downloaded from a remote server.

If the payload is considered appropriate to draw, the renderer will attempt to access each of the references of the quad node. If the reference contains an address to a file in local memory, the renderer will go to that child quad node and read the payload, repeating the process for each subsequent child quad node until: (1) the renderer encounters a quad node with a payload that has a bounding volume completely disjoint from the view specification; or (2) the node level is greater than the next highest node level associated with the level of detail calculation (e.g. ceil (lod_calc)). If the reference does not contain an address in the local memory (i.e., the referenced file does not exist in the local memory), the renderer cannot access the file, and will continue to move down the quad node tree without trying to obtain the file. In this embodiment, the renderer only reads from the quad node tree, and does not provide coordinate and resolution information to any other object.

The quad node itself can have a built-in accessor function. When the renderer attempts to access a reference that has a filename, but no corresponding local address, this triggers the accessor function of the quad node to independently place its own address and the child reference number onto a cache node retrieval list, which comprises a list of information identifying files to be downloaded from remotes servers. A network loader in an independent network loader thread reviews the cache node retrieval list and requests the files referenced on the list.

A cache node manager in an independent cache node manager thread allocates space in local memory and organizes files retrieved by the network loader into new quad nodes. The cache node manager also updates the parent quad nodes with the local memory address of these new child quad nodes. Therefore, on subsequent cycles of the renderer module, there will be additional quad nodes in local memory for the renderer to access. As in previous cycles, the renderer will look at the payload and draw all drawable data that does not fall completely outside the view specification. The renderer thread will continue this cycle until it reaches a quad node with a payload that has a bounding volume completely disjoint from the view specification, the level of detail is either too coarse or too fine, or is otherwise inappropriate to draw.

The data structure can specify imagery data to be rendered in the form of both geometric objects, such as geometric terrain tiles, and texture objects. Geometric objects can include information used to render three-dimensional objects and terrain in the geospatial view provided at the client device. Texture data can be used to render details, colors, textures, labels, and other features on the surfaces of the three-dimensional objects. The texture objects can be based on digital maps, satellite images, aerial photographs, street-level photographs and other imagery stored at the server. For instance, the geographic terrain of an area of interest can provide the basis for geometric objects for the area of interest while satellite imagery can be used to render texture objects on the surface of the geographic terrain. The data structure can specify other data to be drawn, such as vector data including representations of roads and other features.

Figure 3:
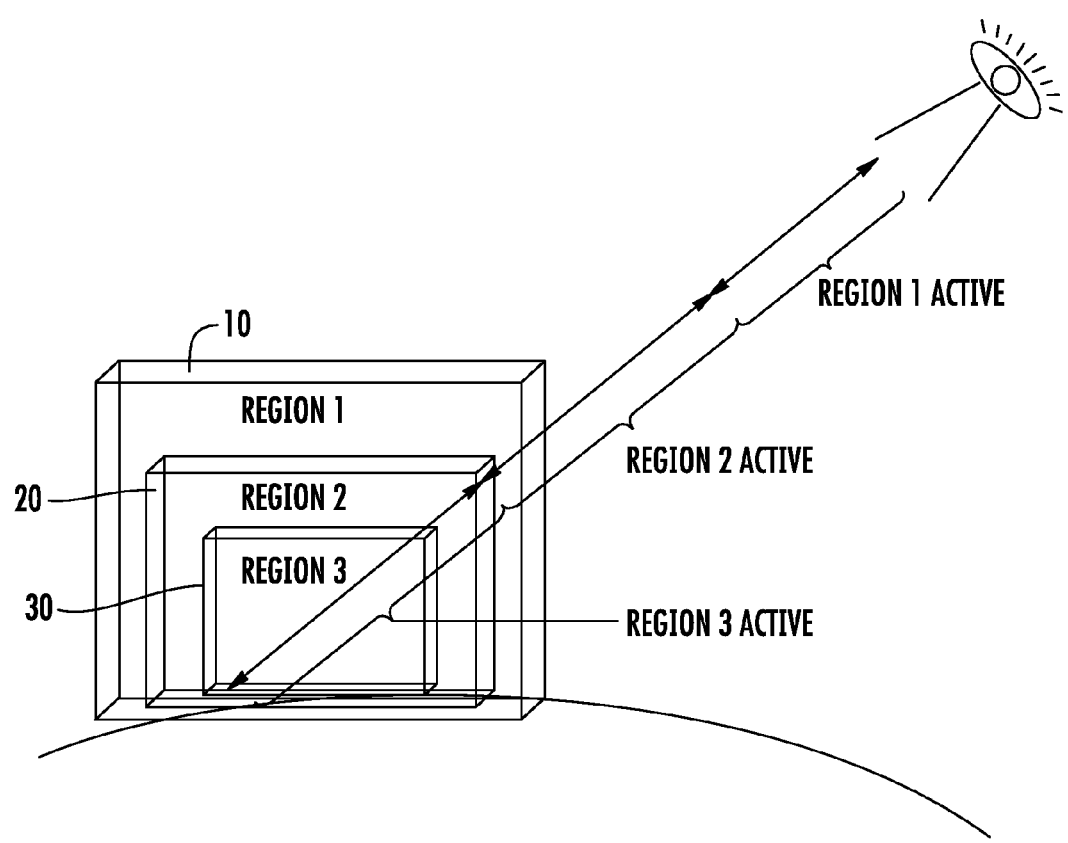
FIG. 3 depicts a conceptual diagram of the use of level of detail in various regions. In particular, region 10 has a higher level of detail than region 20. Region 20 has a higher level of detail than region 30.

The geometric objects, texture objects, and other objects can have varying levels of detail (LOD) based on the user's viewpoint or camera distance relative to the area of interest. For instance, FIG. 3 provides a conceptual illustration of the use of level of detail in differing regions. The regions 10, 20, and 30 in FIG. 3 can be used to specify level of detail specifications associated with data objects, such as texture objects, of increasingly finer levels of detail. The regions can have similar amounts of geometry and texture, but finer level of detail regions can cover a smaller area.

Each region 10, 20, and 30 corresponds to a range of level of detail values that specify the same pixel size but covering increasingly smaller regions. As the user's viewpoint (e.g. camera distance) moves closer, the regions with finer resolution replace the previously loaded regions with coarser resolution and are rendered in the visual environment relative to the virtual camera viewpoint. Accordingly, the geometric objects, such as terrain tiles, and the texture objects can be separated into distinct level of detail levels so that different objects are displayed as the user explores a given area from different camera distances relative to the geographic area.

The level of detail level associated with the geometric objects, such as geometric tiles, for a rendered scene can be specified as a level of detail value, for instance, in the range of 1-20. The higher the level of detail value, the finer the level of detail associated with the object. For instance, an object with a level of detail value of 15 has a finer level of detail than an object with a level of detail of 10. As discussed in more detail below, node levels in a hierarchical tree data structure can be associated with integer level of detail values (e.g. 15, 16, and 17). The computed level of detail associated with a specific camera distance, pixel size, etc. can be a fractional level of detail value (e.g. 15.2, 15.5, 16.0, etc.). While level of detail values in the range between 1-20 are used for discussion purposes, those of ordinary skill in the art, using the disclosures provided herein, should understand that any metric or range of for comparing level of detail between objects can be used without deviating from the scope of the present disclosure.

Figure 4:
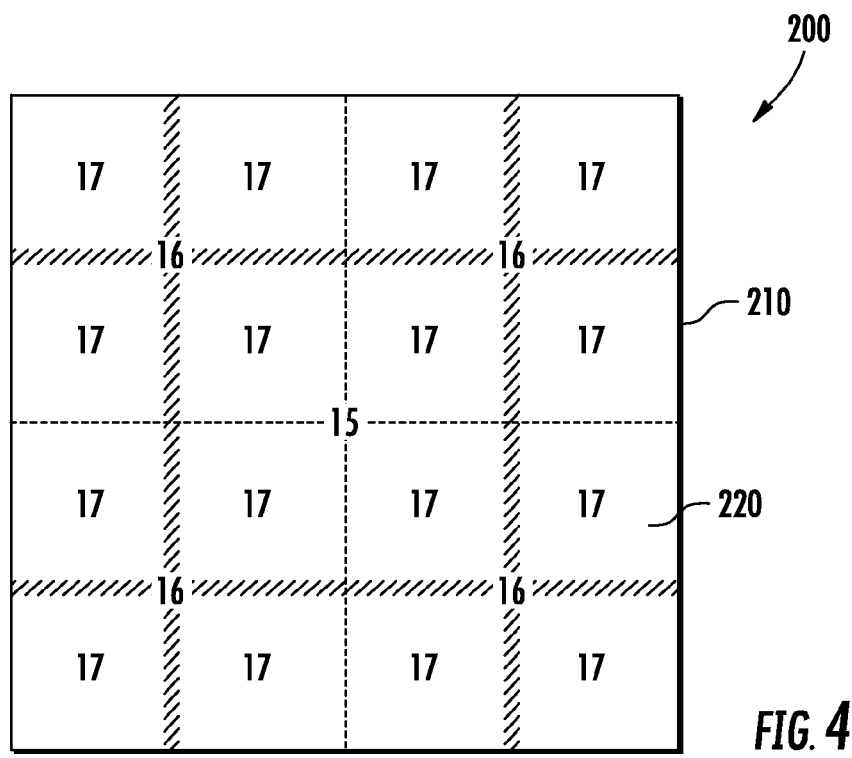
FIG. 4 depicts a hierarchy for quadtree geometric tiles according to an exemplary embodiment of the present disclosure.

FIG. 4 depicts a representation showing the logical structure of geometric tiles configured pursuant to a quadtree data structure according to an exemplary embodiment of the present disclosure. While the present subject matter will be discussed with reference to a quadtree hierarchical tree data structure and recursive partitioning scheme for purposes of illustration and discussion, those of ordinary skill in the art, using the disclosures provided herein, should understand that the subject matter of the present disclosure is equally applicable to any recursive partitioning scheme, such as an octree based partitioning scheme and data structure or any other hierarchical partitioning of space.

Figure 5A:
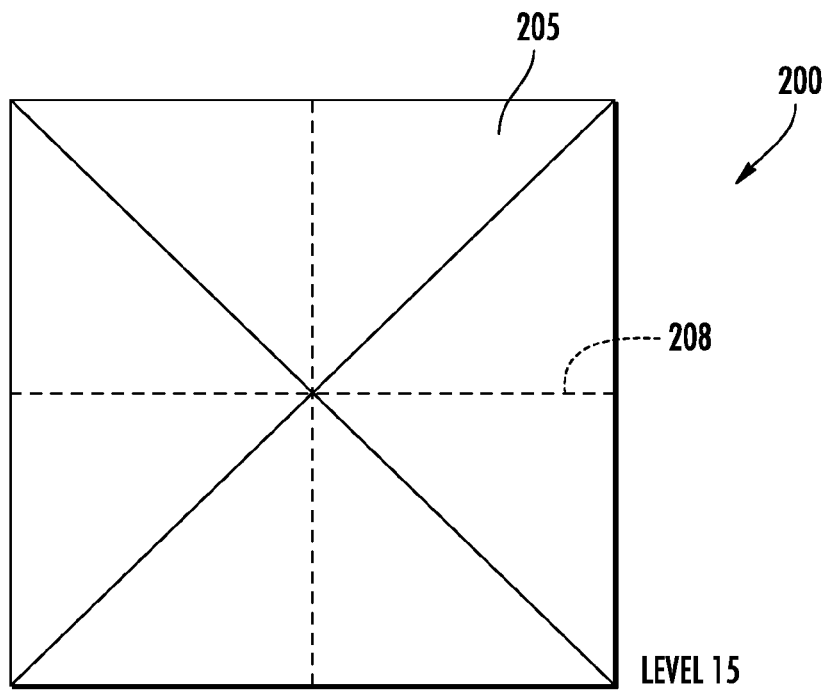
FIGS. 5A-5C illustrate exemplary geometric tiles of varying levels of detail according to an exemplary embodiment of the present disclosure.

Geometric objects associated with the terrain and other three-dimensional objects (e.g. bridges, buildings, etc.) of a geographic area can be provided as geometric tiles configured in a quadtree data structure to facilitate fetching and displaying of only those portions of geometry within the camera view at an appropriate level of detail (i.e. resolution), with higher resolution tiles being depicted at camera distances closer to the geographic area. As shown in FIG. 4, a first geometric tile 200 associated with a first level of detail, such as level of detail level 15, can be rendered to provide a representation of the geometry of a geographic area. The first geometric tile 200 can be displayed to a user when the camera distance is at a first camera distance associated with the first level of detail. As illustrated in FIG. 5A, the first geometric tile 200 can include a plurality of geometric objects, such as mesh triangles 205, that are used to model the terrain and other geometric objects of the geographic area. The first geometric tile 200 can also be partitioned into a plurality of sub-tiles or quadrants 208 (indicated by dashed lines in FIG. 5A). As will be discussed in more detail below, one of the sub-tiles 210 can be independently blended with a child geometric tile during a transition from a first camera distance to a second camera distance.

Figure 5B:
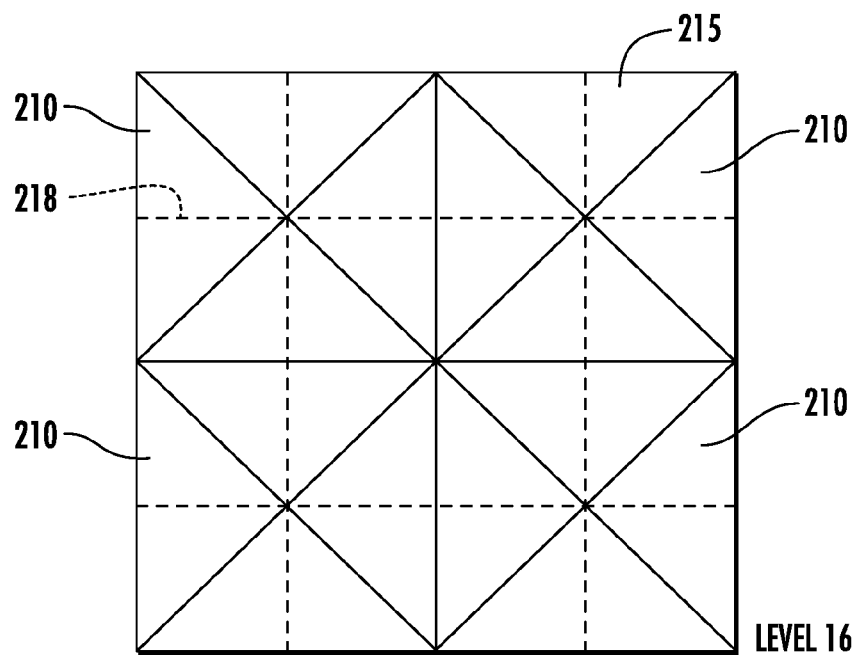

Referring back to FIG. 4, the first geometric tile 200 can be part of a payload of a quad node in a quadtree data structure with links to four child geometric tiles, namely second geometric tiles 210. Second geometric tiles 210 can be associated with a second level of detail, such as level of detail level 16, which is higher than the first level of detail. FIG. 5B shows four second geometric tiles 210 associated with level 16. As shown in FIG. 5B, the second geometric tiles 210 can also include a plurality of geometric objects, such as mesh triangles 215, that are used to model the terrain and other geometric objects of the geographic area. Each of the four geometric tiles 210 includes a similar number of mesh triangles 215 as the parent geometric tile 200, but covering a smaller area (e.g. ¼ the area of the parent geometric tile). In this regard, the four geometric tiles 210 provide higher resolution geometry in the representation of the geographic area. The second geometric tiles 210 can also be partitioned into a plurality of sub-tiles or quadrants 218 (indicated by dashed lines in FIG. 5B). One or more of the sub-tiles 218 can be blended independently with a child tile during a level of detail transition.

Referring back to FIG. 4, a second geometric tile 210 covers roughly one fourth of the geographic area as the first geometric tile 200. As the camera distance transitions from a first camera distance associated with the first level of detail to the second camera distance associated with the second level of detail, the quadtree data structure can be traversed such that the second geometric tiles 210 replace the first geometric tile 200 in the representation of the geographic area. In this manner, geometric tiles associated with higher levels of detail can be displayed as the camera distance moves closer to the geographic area.

Figure 5C:
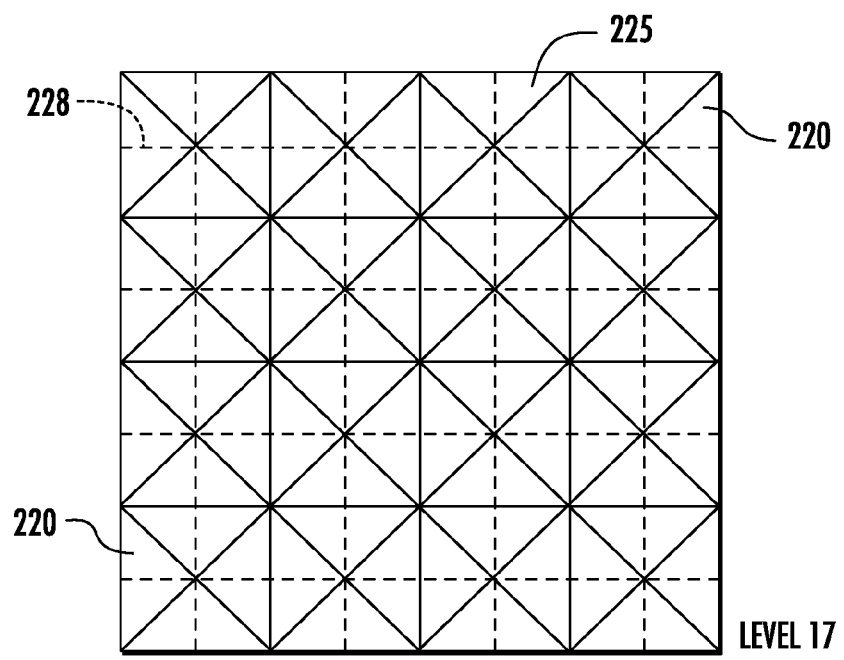

The second geometric terrain tiles 210 can also be payloads of quad nodes in a quadtree data structure. Each of these quad nodes can include links to four child geometric tiles, namely third geometric tiles 220. Third geometric tiles 220 can be associated with a third level of detail, such as level of detail level 17, which is higher than the first and second levels of detail. FIG. 5C depicts sixteen third geometric tiles 220 associated with level 17. As shown in FIG. 5C, the third geometric tiles 220 can also include a plurality of geometric objects, such as mesh triangles 225, that are used to model the geometry of the geographic area. Each of the sixteen geometric tiles 220 includes a similar number of mesh triangles 225 as a parent geometric tile 210, but covering a smaller area (e.g. ¼ the area of the parent geometric tile 210). In this regard, the sixteen geometric tiles 220 provide higher resolution geometry in the representation of the geographic area relative to the parent tiles. The second geometric tiles 220 can also be partitioned into a plurality of sub-tiles or quadrants 228 (indicated by dashed lines in FIG. 5C). One or more of the sub-tiles 228 can be blended independently with a child tile during a level of detail transition.

A third geometric tile 220 covers roughly one fourth of the geographic area as the second geometric tile 210, and one sixteenth of the geographic area as the first geometric tile 200. As the camera transitions to a third camera distance associated with the third level of detail, the quadtree data structure can be traversed such that the third geometric tiles 220 replace the geometric tiles associated with coarser levels of detail in the representation of the geographic area.

The substitution of coarser level of detail geometric tiles with higher level of detail geometric tiles can cause a distracting pop during navigation of the geographic area. To reduce the distracting pop, aspects of the present disclosure include generating a blend between geometric tiles of varying levels of detail and adjusting the blend as a function of camera distance over a transition range between the camera distance associated with a first level of detail and a camera distance associated with a second level of detail. In this manner, smoother level of detail transitions for geometric tiles in a graphics application can be provided.

Figure 6:
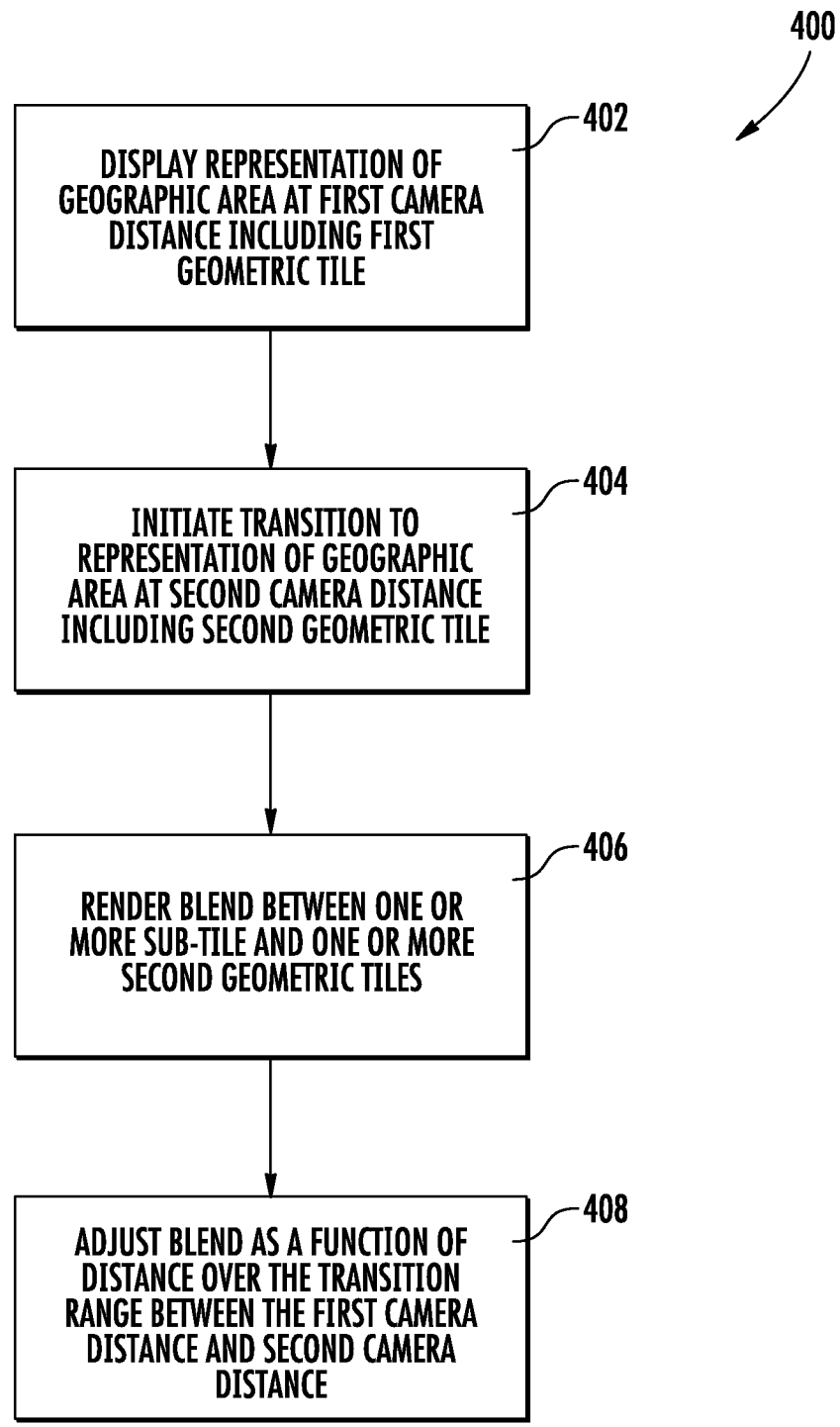
FIG. 6 depicts a flow diagram of an exemplary computer-implemented method of providing level of detail transitions according to an exemplary embodiment of the present disclosure.

FIG. 6 depicts an exemplary flow diagram of a computer-implemented method (400) for providing smooth level of detail transitions in a graphics application according to an exemplary embodiment of the present disclosure. The method (400) can be implemented using any suitable computing device, such as by the client 125 implementing the mapping module 130 of FIG. 1. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (402), the method includes displaying a representation of the geographic area at a first camera distance associated with the first level of detail in the user interface of a display device. The representation of the geographic area can include a plurality of first geometric tiles associated with a first level of detail. For instance, the representation can include the first geometric tile 200 of FIG. 4.

At (404) of FIG. 6, the method includes initiating a transition to a representation of the geographic area at a second camera distance associated with a second level of detail. For instance, a user input can be received to zoom in the geographic area from the first camera distance to the second camera distance. The representation of the geographic area at the second camera distance can include a plurality of second geometric tiles associated with the second level of detail. For instance, the plurality of second geometric terrain tiles can be the second geometric tiles 210 of FIG. 4. The second geometric tiles can be child tiles in a hierarchical tree data structure relative to the first geometric tiles.

Figure 7:
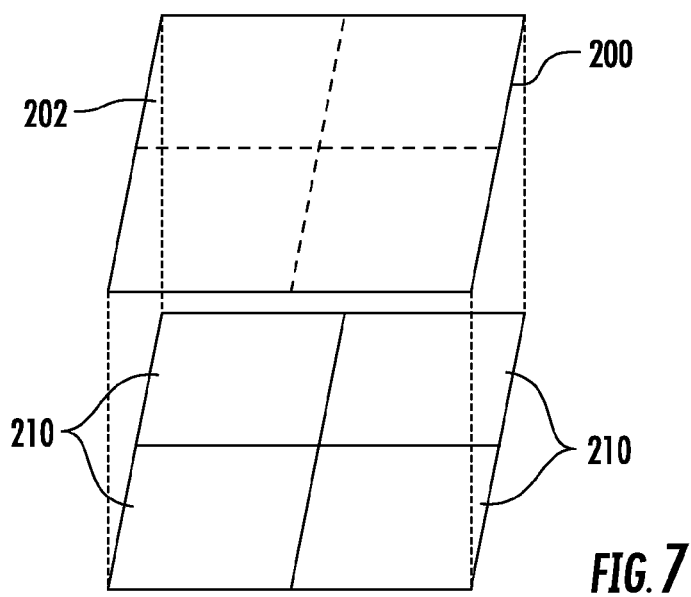
FIG. 7 depicts a geometric tile partitioned into a plurality of sub-tiles that correspond to child geometric terrain tiles according to an exemplary embodiment of the present disclosure.

At (406) of FIG. 6, the method includes rendering in the user interface of a display device a blend between one or more sub-tiles of the first geometric tile and one or more of the second geometric tiles. The sub-tile is obtained by partitioning the first geometric tile into a plurality of sub-tiles or quadrants. Each of the sub-tiles or quadrants is associated with or overlaps the same geographic coordinates as one of the child second geometric tiles. For instance, as illustrated in FIG. 7, the first geometric tile 200 is partitioned into quadrants or sub-tiles 202. Each sub-tile 202 overlaps or is associated with the same geographic coordinates as one of the child second geometric tiles 210.

The first geometric tile can be split into sub-tiles after the initiation of the transition from the first camera distance to the second camera distance. Alternatively, the first geometric tile can be previously partitioned into sub-tiles. For instance, the first geometric tile can include data identifying partitions in the first geometric tile when the tile is fetched or received from a memory location, such as from a server.

Because the first geometric tile has been partitioned into sub-tiles, each of the sub-tiles can be independently blended with one of the second geometric terrain tiles. The blend can be an alpha blend such that geometric objects associated with the sub-tile and the child second geometric tile are rendered at varying transparencies in the blend.

Figure 8:
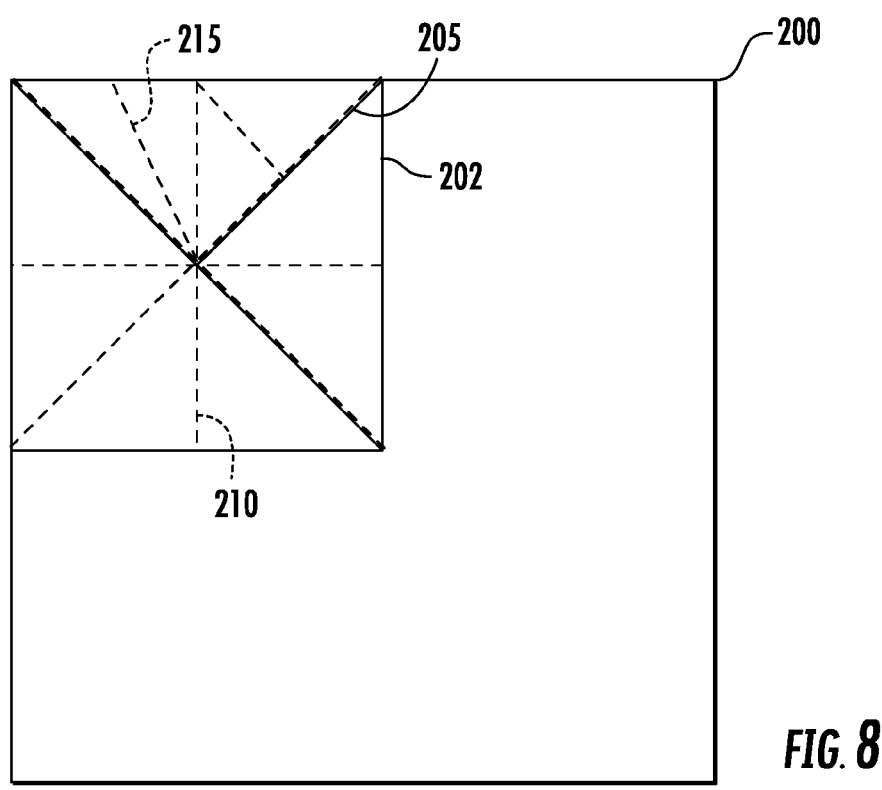
FIG. 8 depicts an exemplary blend between a sub-tile and a child geometric tile according to an exemplary embodiment of the present disclosure.

FIG. 8 depicts an exemplary blend between a sub-tile 202 of the first geometric tile 200 and a second geometric tile 220. As shown, the blend includes aspects of both the sub-tile 202 and the second geometric tile 210. In particular, the blend includes geometric objects 205, such as mesh triangles, associated with the sub-tile 208 and geometric objects 215 associated with the second geometric tile 210. The alpha values associated with sub-tile 208 and the second geometric tile 220 control the transparencies of the geometric objects 205 and 215 in the blend.

At (408) of FIG. 6, the method includes adjusting the blend as a function of distance over the transition range between the first camera distance and the second camera distance. For example, referring to FIG. 8, the transparency of the geometric objects 215 associated with second geometric terrain tile 210 can be decreased as the camera distance approaches the second camera distance associated with the second level of detail. In addition, the transparency of the geometric objects 205 associated with the sub-tile 208 can be increased as the camera distance approaches the second camera distance associated with the second level of detail. The transparencies of the respective geometric objects can be adjusted by adjusting the alpha values associated with the second geometric tile 210 and the sub-tile 208 as a function of distance over the transition range between the first camera distance and the second camera distance. In this manner, the geometric objects 215 associated with the second geometric tile 210 can gradually fade into view while the geometric objects 205 associated with the sub-tile 208 gradually fade from view.

According to a particular aspect of the present disclosure, the blend can be adjusted pursuant to an unpop algorithm over the transition range. The unpop algorithm can adjust the respective alpha values associated with the sub-tile and the child second geometric tile to prevent visual artifacts and blurring from occurring during the transition range between the first camera distance and the second camera distance.

In one example, the unpop algorithm can increase the opacity of the second geometric tile from about 0% to about 100% over a first portion of the transition range while the sub-tile is maintained at an opacity of about 100%. The unpop algorithm can then decrease the opacity of the sub-tile in the blend from 100% to 0% over a second portion of the transition range while the second geometric tile is maintained at an opacity of about 100%. This can avoid situations where geometric objects associated with both the sub-tile and the second geometric terrain tile are both rendered at less than 100% opacity.

This exemplary unpop algorithm can be implemented as follows: Given a sub-tile at a first level of detail ("LOD") (e.g. a coarser LOD) and a second geometric terrain tile at a second LOD (e.g. a finer LOD), alpha values can be computed based on a fade parameter t as defined below:

$$t = \text{lod\_calc} - \text{first LOD};$$

$$0 < \text{range} <= 1$$

$$\text{switch} = \text{range}/2$$

Range is representative of the unpop range relative to the transition range over which the unpop algorithm is performed. For instance, if the unpop algorithm is implemented over the entire transition range, then range will be equal to 1. If the unpop algorithm is implemented only over a subset of the transition range as discussed in more detail below, then range will be less than 1. For instance, if the unpop algorithm is implemented over 20% of the transition range, then range will be equal to 0.2. Within the unpop range, geometric tiles associated with both the first LOD and the second LOD are drawn. Otherwise only one geometric tile associated with the appropriate LOD is drawn.

The fade parameter t is determined based on the calculated level of detail lod_calc. Lod_calc can be determined as a function of camera distance, projected pixel size, and other parameters. As mentioned above, lod_calc can be a fractional value (e.g. 14.5, 14.7, 15.0). For instance, lod_calc can be a calculated level of detail (e.g. 14.2) between the first LOD (e.g. 14) and the second LOD (e.g. 15). As an example, if the camera distance is the camera distance associated with LOD 14, lod_calc can be equal to 14.0. If the camera distance is the camera distance associated with LOD 15, lod_calc can be equal to 15.0. If the camera distance is somewhere between the camera distance associated with LOD 14 and the camera distance associated with LOD 15, such as a distance within the LOD transition range between the camera distance associated with LOD 14 and LOD 15, lod_calc can be 14.x, (e.g. 14.2, 14.5, etc.), with x depending on the camera distance in the transition range.

Figure 9:
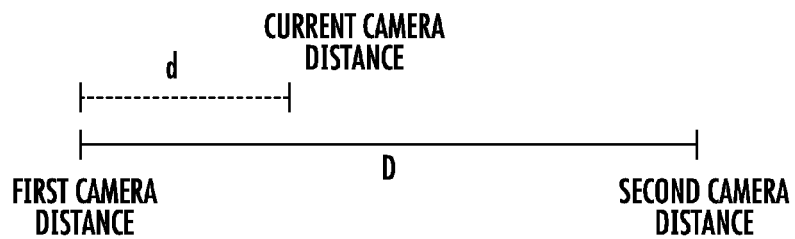
FIG. 9 depicts a graphical representation of a transition range between a first camera distance and a second camera distance according to an exemplary embodiment of the present disclosure.

For instance, as shown in FIG. 9, d is the current camera distance in the transition range relative to the first camera distance associated with, for instance, LOD 14. D is the total camera distance of the transition range from the first camera distance to the second camera distance associated with, for instance, LOD 15. Lod_calc can increase from 14.1 to 14.2 to 14.3 to 14.4 and so forth as d approaches D during the transition from the first camera distance to the second camera distance.

The alpha values $\alpha_1$ associated with the sub-tile and $\alpha_2$ associated with the second geometric terrain tile are computed as follows:

|  | 0 < t < switch | switch <= t < range | range <= t |
|---|---|---|---|
| $\alpha_1$ | 1 | (range − t)/switch | 0 |
| $\alpha_2$ | t/switch | 1 | 1 |

Figure 10:
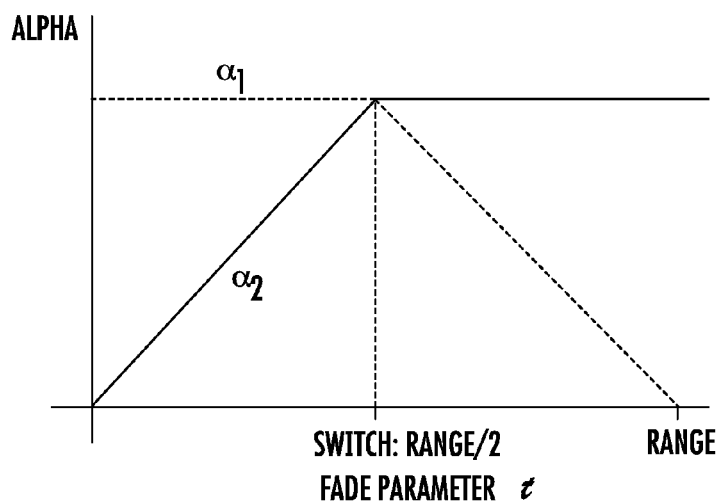
FIG. 10 depicts a graphical representation of alpha values in a blend as a function of a fade parameter pursuant to an exemplary unpop algorithm according to an exemplary embodiment of the present disclosure.

A graphical representation of the alpha values for the sub-tile and the child second geometric tile as a function of the fade parameter t is depicted in FIG. 10. As shown, the alpha value $\alpha_2$ associated with the second geometric tile is gradually increased from 0 to 1 over a first portion of the range while the alpha value $\alpha_1$ associated with the sub-tile is maintained at about 1. The alpha value $\alpha_1$ associated with the sub-tile is gradually decreased from 1 to 0 over a second portion of the range while the alpha value $\alpha_2$ is maintained at about 1.

The unpop algorithm can be performed with z-buffer enabled. More particularly, the z-buffer can be enabled to sort geometries during the unpop transition. First, opaque geometric tiles (tiles with alpha values=1) can be rendered front to back. Then transparent geometric tiles (tiles with alpha values<1) can be rendered back to front. This allows rendering of tiles pursuant to an unpop algorithm such that transparent tiles do not occlude opaque tiles.

According to a particular aspect of the present disclosure, the unpop algorithm can be implemented only over a subset of the transition range, such as only over 20% of the transition range. This can save computing resources by reducing the percentage of double drawing of the geometric tiles. For example, performing an unpop algorithm over the entire transition range can require an increase of 24% in draw calls and 36% in triangles. Implementing the unpop algorithm over only 10% of the transition range (e.g. range=0.1) results only in an increase of 9% in draw calls and 12% in triangles. Another benefit of implementing the unpop algorithm only over a subset of the transition range is that the tile associated with the coarser LOD is not drawn as long and does not obscure the finer LOD for as long a period of time.

In a variation of this particular embodiment, the unpop range can be varied as a function of camera speed. For instance, a faster moving camera speed can have a shorter unpop range. A slower moving camera can have a longer unpop range. As a result, the LOD transitions according to aspects of the present disclosure can be dynamically adjusted as a function of camera speed.

According to another exemplary embodiment of the present disclosure, a bias can be implemented in the level of detail calculation (e.g. lod_calc) to avoid visual artifacts that can occur during transitioning pursuant to an unpop algorithm. For example, a bias equal to the unpop range can be added to lod_calc in the determination of the fade parameter t, such that blending occurs between tiles that are not blurry at a particular camera distance. For instance, at a camera distance associated with a lod_calc of 15.4, a blend with no level of detail bias can be generated between sub-tiles associated with LOD 15 and geometric tiles associated with LOD 16. The sub-tiles associated with LOD 15 may appear blurry.

To address this, a bias can be added to the level of detail calculation. The bias can be equal to the unpop range such that that the coarser tile rendered during the transition is the next highest level of detail associated with the level of detail calculation. For instance, at a camera distance associated with a level of detail calculation of 15.4, lod_calc can be determined to be 16.4 by adding a bias equal to the unpop range (in this example 1) to the level of detail calculation. This results in blending between sub-tiles associated with LOD 16 and geometric tiles associated with LOD 17, preventing the rendering of blurry tiles during the level of detail transition.

When traversing a hierarchical tree data structure (e.g. a quadtree or octree data structure) during a transition from a first camera distance associated with a parent node to a second camera distance associated with the child node (i.e. a cross-node transition), computed LODs for parent nodes versus child nodes in the hierarchical tree data structure can be significantly different due to independent level of detail calculations for each node (e.g. projection of a node bounding sphere onto the view plane). For example, the level of detail calculation for a level 16 node can be 16.99 while the level of detail calculation of one of its children nodes can be 17.3. This discontinuity in the level of detail calculation while performing cross-node transitions can lead to a distracting pop even when blending pursuant to an unpop algorithm. For instance, as the camera distance approaches the distance associated with the child nodes, a distracting pop can occur when the unpop algorithm provides for the drawing/blending of a level 17-18 unpop pair (due to LOD calculation of 17.3) as opposed to the drawing/blending of a level 16-17 unpop pair (provided for by the LOD calculation of 16.99).

According exemplary aspects of the present disclosure, the level of detail calculation can be modified during cross-node transitions to reduce popping. In particular, when transitioning from a coarser level of detail to a finer level of detail, cross-node transitions can be made smoother by interpolating the level of detail calculation of the child nodes with the level of detail calculation of the parent node. This reduces the disparity between the level of detail calculation associated with the parent node and the level of detail calculation associated with the child node. As a result, cross-node transitions are less likely to result in a distracting pop.

When transitioning from a finer level of detail to a coarser level of detail, cross-node transitions can be made smoother by always looking at the payloads of the next higher level children nodes in the hierarchical tree data structure. For example, when transitioning from a finer level of detail to a coarser level of detail, the level of detail associated with the coarser level of detail can be analyzed to determine whether it is within a threshold of a level of detail boundary. If so, the nodes associated with next highest level of detail can be visited while traversing the hierarchical tree data structure to ensure that the blending occurs between the next higher level unpop pair (e.g. level 17-18) unpop pair versus the lower level unpop pair (e.g. level 16-17).

As discussed above, the partitioning of the first geometric tile into sub-tiles allows for the independent blending of the sub-tiles with the child geometric tiles during the transition between a first camera distance and a second camera distance. The independent blending of sub-tiles can result in the rendering of blends between adjacent sub-tiles of differing levels of detail, which can lead to gaps between geometric objects in the respective adjacent sub-tiles. According to one embodiment of the present disclosure, interior terrain skirts can be rendered between adjacent sub-tiles of varying levels of detail to smooth out any gaps or other anomalies between geometric objects in the sub-tiles.

Figure 11:
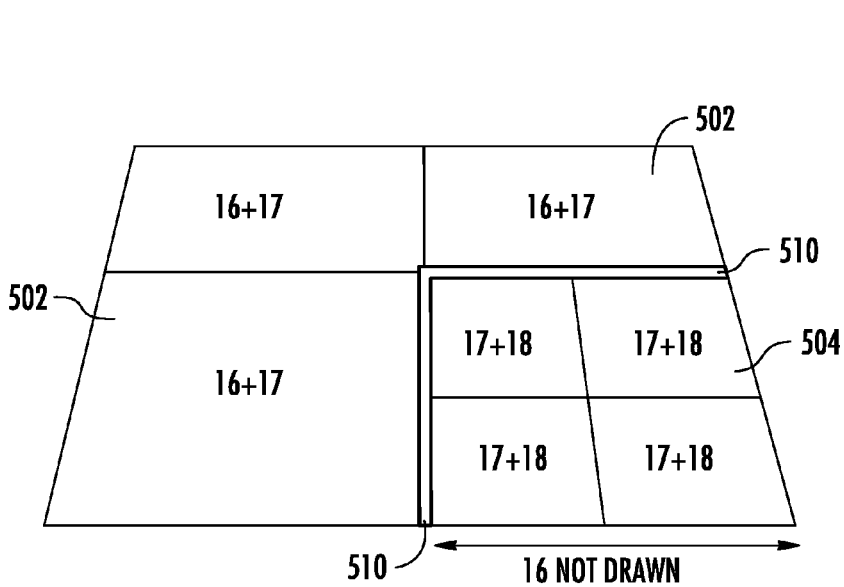
FIG. 11 depicts rendering terrain skirts between adjacent sub-tiles of varying levels of detail according to an exemplary embodiment of the present disclosure.

For example, FIG. 11 depicts a representation of a geographic area from a viewpoint associated with a view towards the horizon. The representation includes a first geometric tile 500 that is used to model the terrain and other geometry of the geographic area. During a transition from a first camera distance to a second camera distance, the first geometric tile 500 can be partitioned into sub-tiles or quadrants. These sub-tiles can be independently blended with child geometric tiles during the transition from the first camera distance to the second camera distance to provide a smooth level of detail transition.

The transition can result in blends between varying levels of detail among adjacent sub-tiles. For instance, sub-tiles 502 can include blends between sub-tiles at level 16 and child geometric terrain tiles at level 17. Sub-tile 504 can include blends associated with higher levels of detail, such as between level 17 and level 18. This can be due to, for instance, the proximity of the sub-tile 504 to the camera view relative to the other sub-tiles 502. In this example, level 16 may not be able to be drawn in association with sub-tile 204 in the lower right quadrant because blending pursuant to an unpopping algorithm restricts blending to two partners to reduce the number of triangles and pixels rendered. In addition, rendering the lower level of detail geometry in the sub-tile 204 can result in coarser geometric objects poking through through the higher level of detail geometry.

As a result, adjacent subtiles 502 and 504 can be rendered at different levels of detail during the transition. Accordingly, geometric objects, such as mesh triangles, between adjacent sub-tiles may not line up, leading to gaps or other anomalies in the terrain. Interior terrain skirts 510 can be rendered between the sub-tile 504 and adjacent sub-tiles 502 to smooth out any gaps or other anomalies between adjacent sub-tiles.

A camera stop at a camera distance in the transition range between the first camera distance and the second camera distance can cause geometric tiles to be rendered as a blend in the middle of an unpop transition, resulting in potential visual artifacts. Another exemplary aspect of the present disclosure is directed to adjusting the blend over time during the camera stop such that the geometric tiles can be snapped to the next highest level of detail.

Figure 12A:
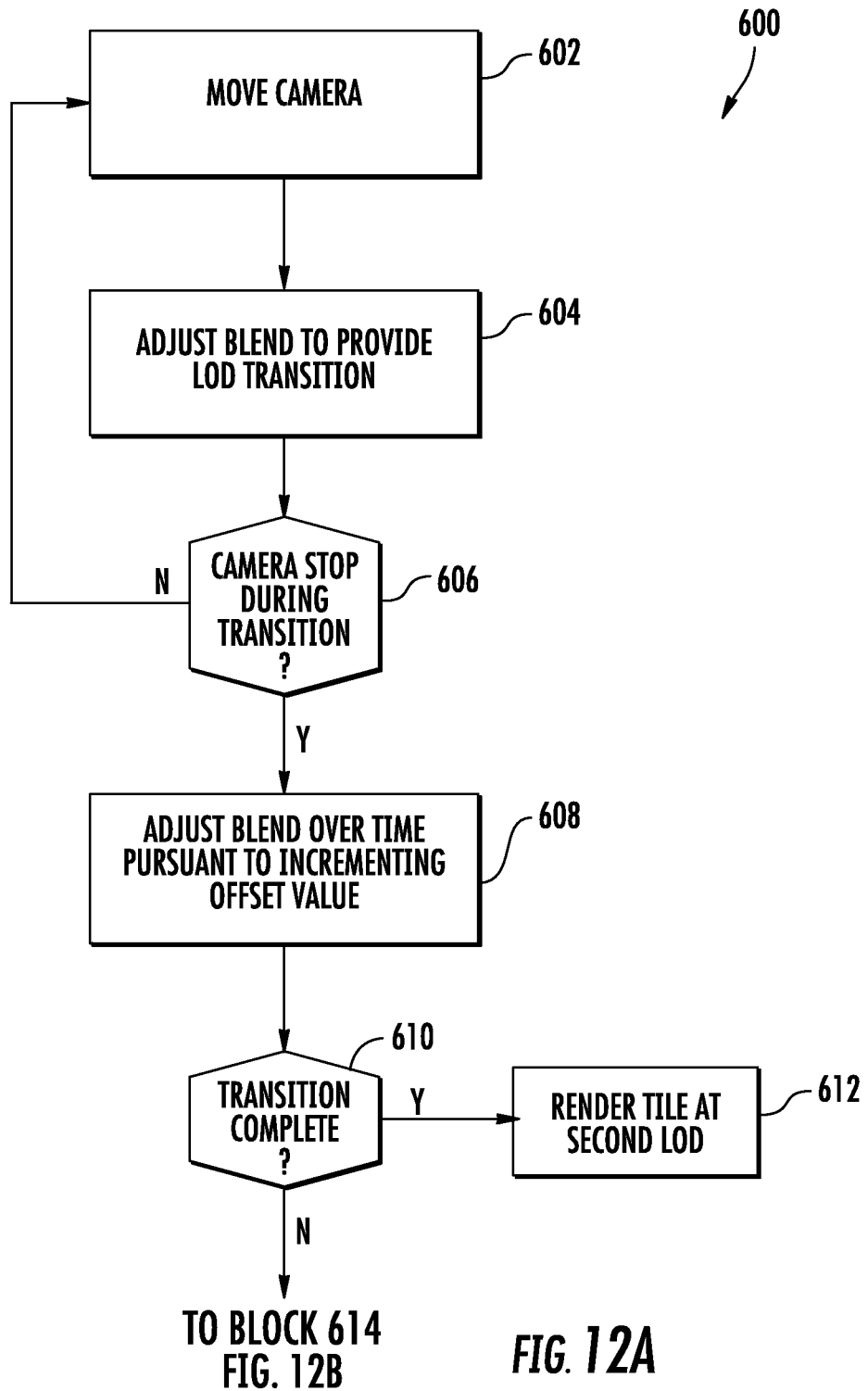
FIGS. 12A and 12B depict a flow diagram of an exemplary method for implementing a time based level of detail fade during a camera stop according to an exemplary embodiment of the present disclosure.
Figure 12B:
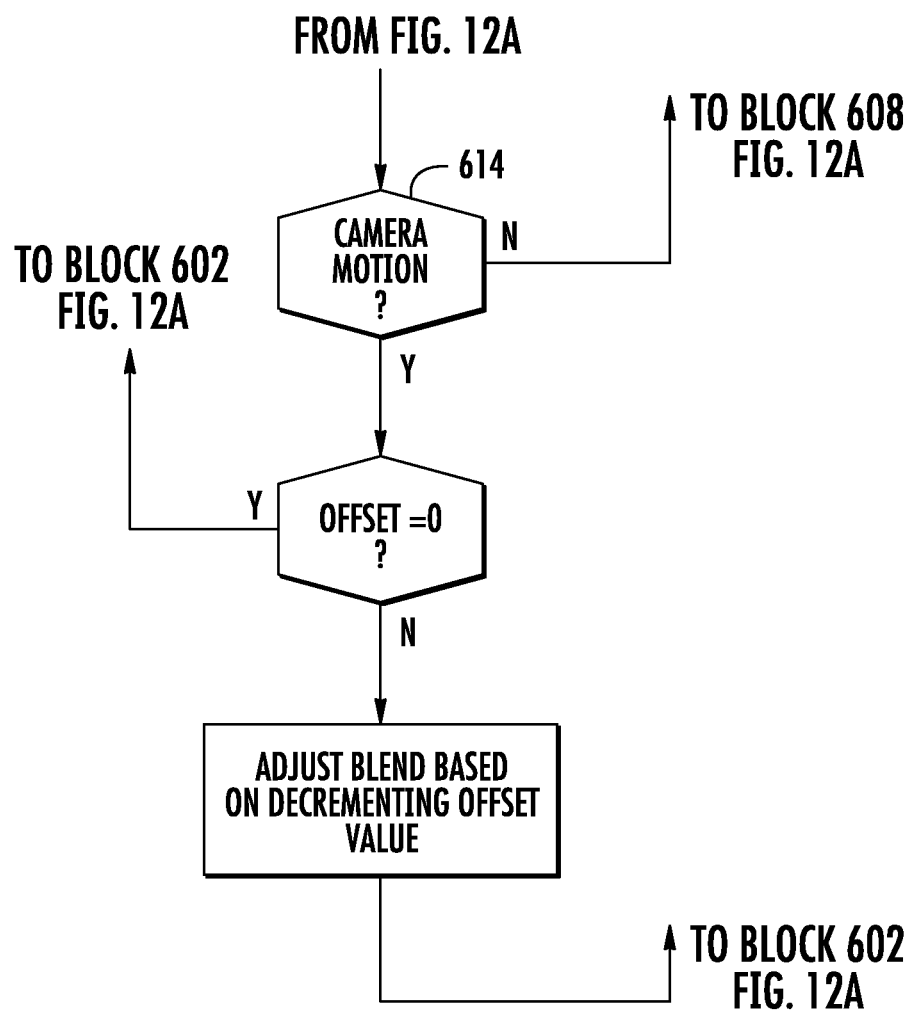

FIGS. 12A and 12B depict an exemplary method (600) for adjusting the blend over time during a camera stop according to an exemplary embodiment of the present disclosure. At (602) the method includes moving a camera from a first camera distance associated with a first level of detail to a second camera distance associated with a second level detail. As discussed above, the method at (604) can adjust a blend between one or more sub-tiles of a first geometric tile associated with the first camera distance and one or more second geometric tiles associated with the second camera distance as a function of camera distance over the transition range between the first camera distance and the second camera distance to provide a level of detail transition for the camera motion.

At (606), the method can determine whether there is a camera stop after the camera motion. If not, the method continues to adjust the blend during camera motion to provide a level of detail transition as illustrated in FIG. 12A. If there is a camera stop, the method includes adjusting the blend over time using an incrementing offset value (608). The incrementing offset value is used to provide a time based level of detail transition during the camera stop.

In one example, the incrementing offset value is a value that is added to the level of detail calculation (e.g. lod_calc) in determining the fade parameter for the unpop algorithm. As an example, an adjusted LOD calculation alod_calc can be determined as follows: alod_calc=(Min(lod_calc+offset, ceil (lod_calc)), where ceil(lod_calc) provides the next highest integer level of detail associated with the lod_calc. The fade parameter can be determined based on alod_calc and the blend can be rendered based on the fade parameter as discussed in more detail above.

The offset can be increased incrementally over time at a first blend rate as the camera is stationary at a camera distance until the geometric tiles are eventually snapped to the second LOD. For instance, the offset can be increased every rendering frame until the tiles are rendered at the second LOD with no blending between tiles. The first blend rate is the rate at which the offset is increased. The first blend rate can be tied to wall clock time so that incrementing offset is equal to 1 in a constant time, such as in less than 0.5 seconds.

This is illustrated in FIG. 12A at (610) where the method determines whether the LOD transition is complete. If so, the method includes rendering the tiles at the second LOD (612). Otherwise, the method continues to (614) where the method determines whether there is camera motion after the camera stop. As long as there is no camera motion after the camera stop, the method continues to render the representation of the geographic area using the incrementing offset value until the LOD transition is complete If there is camera motion after the camera stop, the method determines whether the offset value is zero (616). If so, the method returns to (602) where camera motion results in adjusting the blend as a function of distance to provide the LOD transition (604). If the offset value is not equal to zero, the method includes rendering the blend pursuant to a decrementing offset value (618) until the offset value reaches zero. Here, the offset value can be decreased at a second blend rate that is greater, the same, or less than the first blend rate. In one exemplary embodiment, the second blend rate can be determined based on the speed of the camera motion after the camera stop. The faster the camera motion after the camera stops, the faster the incrementing offset value can be reduced. Once the offset value reaches zero, the method returns to the method returns to (602) where camera motion results in adjusting the blend as a function of distance to provide the LOD transition (604).

According to another aspect of the present disclosure, a time based fade can be implemented to reduce the popping of geometric tiles as new data becomes available. In certain circumstances, the camera can get ahead of the fetching or availability of geometric terrain tiles, causing the viewer to see blurry data before the higher resolution geometric tiles are fetched or otherwise received or become available. When the higher resolution geometric tiles are received or otherwise become available, the user can see a distracting pop as the higher resolution tiles come into view. To reduce the pop, a transition to the new level of detail can be implemented using a blend between the coarser level of detail geometric terrain tiles and the finer level of detail geometric terrain tiles. The blend can be adjusted using a time based level of detail fade. The time based level of detail fade can cause a gradual transition from the coarser resolution geometric terrain tiles to the finer resolution geometric terrain tiles.

For example, a viewer can zoom from a representation of a geographic area at a first camera distance having a plurality of first geometric terrain tiles to a representation of a geographic area at camera distance associated having a plurality of second geometric terrain tiles that have not yet been retrieved from a server or memory. When the second geometric terrain tiles are received, instead of immediately rendering the newly available second geometric terrain tiles, a time based fade can be implemented to slowly transition from the first geometric terrain tiles at the previous level of detail to the newly available second geometric terrain tiles. The time based fade can be implemented by rendering a blend between the first geometric terrain tiles and the second geometric terrain tiles that is adjusted over time pursuant to a transition rate until the representation is snapped to the level of detail associated with the second geometric terrain tiles. The transition rate can be tied to wall clock time so that a single level transition can happen in a relatively short period of times, such as less than one second. The transition rate for the time based level of detail fade can be scaled based on the number of transition levels, speeding up the transition across a greater number of transition levels to ensure a constant scene resolution time.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for providing level of detail transitions in a system for displaying geographic imagery, comprising:
    displaying, in a user interface of a display device, a representation of a geographic area at a first camera distance associated with a first level of detail, the representation at the first camera distance comprising a first geometric tile associated the geographic area, the first geometric tile being rendered at the first level of detail; and
    initiating a transition to a representation of the geographic area at a second camera distance associated with a second level of detail, the representation at the second camera distance comprising a second geometric tile associated with the geographic area, the second geometric tile being rendered at a second level of detail;
    rendering, in the user interface of the display device, a blend between a sub-tile of the first geometric tile and the second geometric tile, the sub-tile obtained by partitioning the first geometric tilt into a plurality sub-tiles;
    adjusting the blend as a function of camera distance over at least a portion of a transition range between the first camera distance and the second camera distance during the transition from the first camera distance to the second camera distance;
    detecting a camera stop at a camera distant within the transition range intermediate the first camera distance and the second camera distance; and
    adjusting blend over time during the camera stop;
    wherein the blend is adjusted over time during the camera stop based on an incrementing offset value, the incrementing offset value affecting a blend ratio between the sub-tile and the second geometric tile, the incrementing offset value being increased at a first blend rate as the camera is stopped.

2. The computer-implemented method of claim 1, wherein the second geometric tile is a child tile relative to the first geometric tile in a geometric tile data structure.

3. The computer-implemented method of claim 2, wherein the sub-tile is associated with the same geographic coordinates as the second geometric tile.

4. The computer-implemented method of claim 2, wherein the geometric tile data structure is a hierarchical tree data structure.

5. The computer-implemented method of claim 1, wherein the blend is an alpha blend.

6. The computer-implemented method of claim 1, wherein the blend is adjusted based at least in part on a level of detail calculation, the level of detail calculation being based on the camera distance and a projected pixel size.

7. The computer-implemented method of claim 1, wherein the blend is adjusted as a function of camera distance over at least a portion of the transition range pursuant to an unpop algorithm.

8. The computer-implemented method of claim 7, wherein the unpop algorithm comprises:
    increasing an opacity of the second geometric tile from 0% to 100% over a first portion of the transition range;
    rendering the sub-tile at an opacity of 100% as the opacity of second geometric tile is increased from 0% to 100% over the first portion of the transition range;
    decreasing the opacity of the sub-tile from 100% to 0% over a second portion of the transition range; and
    rendering the second geometric tile an opacity of 100% as the opacity of the sub-tile is decreased from 100% to 0% over the second portion of the transition range.

9. The computer-implemented method of claim 8, wherein the method comprises implementing a bias in a level of detail calculation used to adjust the blend.

10. The computer-implemented method of claim 9, wherein the bias is equal to the transition range.

11. The computer-implemented method of claim 8, wherein the unpop algorithm is implemented only over a subset of the transition range.

12. The computer-implemented method of claim 1, wherein the transition is a cross-node transition, the method comprising interpolating a calculated level of detail associated with the first geometric tile with a calculated level of detail associated with the second geometric tile.

13. The computer-implemented method of claim 1, wherein the second geometric tile is unavailable during at least a portion of the transition range between the first camera distance and the second camera distance, the method comprising:
    receiving the second geometric tile; and
    adjusting the blend using a time based level of detail fade subsequent to receiving the second geometric tile.

14. The computer-implemented method of claim 1, wherein the method comprises:
    detecting camera motion after the camera stop; and
    reducing the incrementing offset value at a second blend rate, the second blend rate being determined based on a camera speed of the camera motion after the camera stop.

15. A computing device comprising a display device, a memory, and one or more processors, the one or more processors configured to execute computer-readable instructions stored in the memory to cause the one or more processors to perform operations, the operations comprising:
  displaying, in a user interface of the display device, a representation of a geographic area at a first camera distance, the representation at the first camera distance comprising a first geometric tile comprising geometric objects rendered at a first level of detail; and
  initiating a transition to a representation of the geographic area at a second camera distance, the representation at the second camera distance comprising a second geometric tile comprising geometric objects rendered at a second level of detail;
  rendering, in the user interface of the display device, a blend between a sub-tile of the first geometric tile and the second geometric tile, the sub-tile obtained by partitioning the first geometric tile into a plurality sub-tiles;
  adjusting the blend as a function of camera distance pursuant to an unpop algorithm over only a subset of a transition range between the first camera distance and the second camera distance during the transition from the first camera distance to the second camera distance;
  detecting a camera stop at a camera distance within the transition range intermediate the first camera distance and the second camera distance; and
  adjusting the blend over time during the camera stop;
  wherein the blend is adjusted over time during the camera stop based on an incrementing offset value, the incrementing offset value affecting a blend ratio between the sub-tile and the second geometric tile, the incrementing offset value being increased at a first blend rate as the camera is stopped.

16. The computing device of claim 15, wherein the blend is an alpha blend.

17. The computing device of claim 15, wherein the unpop algorithm comprises
  increasing an opacity of the second geometric tile from 0% to 100% over a first portion of the subset of the transition range;
  rendering the sub-tile at an opacity of 100% as the opacity of second geometric tile is increased from 0% to 100% over the first portion of the subset of the transition range;
  decreasing the opacity of the sub-tile from 100% to 0% over a second portion of the subset of the transition range; and
  rendering the second geometric tile an opacity of 100% as the opacity of the sub-tile is decreased from 100% to 0% over the second portion of the subset of the transition range.

18. The computing device of claim 15, wherein the second geometric tile is a child tile relative to the first geometric tile in a geometric tile data structure, the geometric tile data structure being a hierarchical tree data structure.

19. The computing device of claim 15, wherein the sub-tile is associated with the same geographic coordinates as the second geometric tile.

20. The computing device of claim 15, wherein the operations further comprise:
  detecting a camera stop at a camera distance within the transition range intermediate the first camera distance and the second camera distance; and
  adjusting the blend over time during the camera stop.

21. The computing device of claim 15, wherein the operations comprise implementing a bias in a level of detail calculation.

22. The computing device of claim 21, wherein the bias is equal to the transition range.

23. A computer-implemented method for providing level of detail transitions in a geographic information system, comprising;
  displaying, in a user interface of the display device, a representation of a geographic area at a first camera distance, the representation at the first camera distance comprising a first geometric tile comprising geometric objects rendered at a first level of detail; and
  transitioning to a representation of the geographic area at a second camera distance, the representation at the second camera distance comprising a second geometric tile comprising geometric objects rendered at a second level of detail, the second geometric tile comprising a child tile of the first geometric tile in a geometric tile data structure;
  wherein transitioning to the representation of the geographic area at a second camera distance comprises adjusting an alpha blend between a quadrant of the first geometric tile and the second geometric tile as a function of camera distance over a transition range between the first camera distance and the second camera distance, wherein the quadrant is associated with the same geographic coordinates as the second geometric;
  detecting a camera stop at a camera distance intermediate the first camera distance and the second camera distance; and
  adjusting the first alpha value and the second alpha value as a function of time during camera stop;
  wherein the method comprises adjusting the first alpha value and the second alpha value based on an incrementing offset value, the incrementing offset value being increased over time at a first blend rate.

24. The computer-implemented method of claim 23, wherein the alpha blend is adjusted as a function of camera distance over at least a portion of the transition range based on a first alpha value determined for the quadrant and a second alpha value determined for the second geometric tile, the first alpha value and the second alpha value being determined based at least in part on the camera distance within the transition range.

25. The computer-implemented method of claim 23, wherein the method comprises:
  detecting camera motion after the camera stop; and
  decreasing the incrementing offset value over time at a second blend rate, the second blend rate being less than the first blend rate.

26. The computer-implemented method of claim 25, wherein the second blend rate is determined based at least in part on a camera speed of camera motion after the camera stop.

* * * * *

UNITED STATES PATENT AND TRADEMARK OFFICE
CERTIFICATE OF CORRECTION

PATENT NO. : 9,105,129 B2
APPLICATION NO. : 13/626296
DATED : August 11, 2015
INVENTOR(S) : John H. Rohlf It is certified that error appears in the above-identified patent and that said Letters Patent is hereby corrected as shown below:

Claims

Column 22, Line 32, claim 23 after the word "geometric" please insert the word --tile;--

Signed and Sealed this
Twenty-sixth Day of July, 2016

Michelle K. Lee
*Director of the United States Patent and Trademark Office*